United States Patent
Kramer et al.

(10) Patent No.: US 6,299,561 B1
(45) Date of Patent: Oct. 9, 2001

(54) DEVICE FOR CONTROLLING LEVEL OF GEAR LUBRICANT AS A FUNCTION OF SPEED

(75) Inventors: Dennis A. Kramer, Troy; Dale Bell, Ortonville; Ronald N. Brissette, Lake Orion; Christopher S. Keeney, Troy; Brian J. Mueller, Lake Orion, all of MI (US); Jack R. McKenzie, Hendersonville, NC (US)

(73) Assignee: Meritor Heavy Vehicle Systems, LLC, Troy, MI (US)

( * ) Notice: Subject to any disclaimer, the term of this patent is extended or adjusted under 35 U.S.C. 154(b) by 0 days.

(21) Appl. No.: 09/358,627

(22) Filed: Jul. 21, 1999

(51) Int. Cl.⁷ .................................................. F16H 57/04
(52) U.S. Cl. ....................... 475/160; 184/6.12; 184/13.1
(58) Field of Search ........................... 475/160; 184/6.12, 184/13.1, 106

(56) References Cited

U.S. PATENT DOCUMENTS

| | | | |
|---|---|---|---|
| 2,147,146 | * 2/1939 | Carlson et al. | 184/11.2 |
| 3,618,711 | * 11/1971 | Vollmer | 184/6.12 |
| 3,625,310 | * 12/1971 | Herrick | 184/6.12 |
| 3,767,014 | * 10/1973 | Drone | 184/6.12 |
| 3,788,426 | * 1/1974 | Hull | 184/6.12 X |
| 4,018,097 | * 4/1977 | Ross | 184/6.12 X |
| 4,157,045 | * 6/1979 | Suzuki | 184/6.12 X |
| 4,586,395 | * 5/1986 | Fukuchi et al. | 184/6.12 |
| 4,630,711 | * 12/1986 | Levrai et al. | 184/6.12 |
| 4,736,819 | * 4/1988 | Muller | 184/6.12 |
| 4,922,765 | * 5/1990 | Hayakawa et al. | 184/6.12 X |
| 5,099,715 | * 3/1992 | Baiker | 184/6.12 X |
| 5,662,188 | 9/1997 | Ito et al. . | |
| 5,845,546 | 12/1998 | Knowles et al. . | |
| 5,961,419 | * 10/1999 | Hisano et al. | 184/6.12 X |

* cited by examiner

Primary Examiner—Charles A Marmor
Assistant Examiner—Ha Ho
(74) Attorney, Agent, or Firm—Carlson, Gaskey & Olds

(57) ABSTRACT

An device for controlling a level of lubricant in a gear housing of an automotive vehicle that has a sealed interior portion containing lubricant. A gear is rotatably mounted in the housing and rotates through the lubricant. The housing includes at least one wall secured to a bottom portion of the sealed interior portion. The wall defines a first and second space wherein the gear rotates in the first space and displaces the lubricant over the wall into the second space as the gear rotates at high speeds. The wall has an opening of a predetermined size that allows the lubricant to flow back into the first space at a rate greater than the displacement rate at low speeds and less than the displacement rate at high speeds. The gear and housing may be an axle housing, a transmission or other gears and housings.

11 Claims, 2 Drawing Sheets

DEVICE FOR CONTROLLING LEVEL OF GEAR LUBRICANT AS A FUNCTION OF SPEED

BACKGROUND OF THE INVENTION

The invention relates to devices for controlling the level of gear lubricant in a gear housing as a function of the speed of the gear.

Drive axles and transmissions typically have several gear sets that are splash lubricated from an oil sump, or reservoir. As the gears turn in the oil, the gears and bearings are coated with the circulating oil. At high speeds, the gears are essentially pumping the oil creating a force corresponding to energy, or shear, losses in the fluid. Energy losses result in lower fuel economy for the vehicle. Lowering the volume of fluid in the gear housing would minimize losses. However, a lower level would be insufficient at lower speeds to properly lubricate and cool the components.

Devices have been proposed for lubricating a power transmission system and adjusting for speed. One such device uses an active mechanical pump driven by the power transmission system and which has an oil reservoir for storing oil. As the speed of the transmission system increases, oil stored at the bottom of the transmission casing is splashed into the oil reservoir thereby decreasing the amount of oil in the casing. When the speed of the transmission decreases, the mechanical pump pumps the oil from the oil reservoir into the casing to insure proper lubrication of the power transmission. This device, however, is an active mechanical device adding cost and reliability concerns to the manufacture of the automotive vehicle.

Thus, there exists a need for an inexpensive, yet reliable device for minimizing shear losses in the lubricating oil in a gear housing without jeopardizing the components at low speed.

SUMMARY OF THE INVENTION

A device for controlling a level of lubricant in a gear housing of a vehicle having a sealed interior portion containing the gear lubricant therein is disclosed. In one disclosed embodiment, the gear and housing is an axle and axle housing. The axle housing has a ring gear rotatably mounted therein that rotates through the lubricant. At least one wall is secured to a bottom portion of the sealed interior portion. The wall defines a first and second space, and the ring gear rotates in the first space and displaces the lubricant over the wall into the second space as the ring gear rotates at high speeds. The wall has an opening of a predetermined size that allows the lubricant to flow back into the first space at a rate greater than the displacement rate at low speeds and less than the displacement rate at high speeds.

In a preferred embodiment, the device includes a second wall secured to the bottom portion of the sealed interior portion and defines a third space. The ring gear rotates in the first space between the first and second walls and displaces the lubricant over the first wall and second walls into the second and third spaces as the ring gear rotates at high speeds. The second wall has a similar opening as the first wall for allowing the lubricant to flow back into the third space at a rate greater than the displacement rate at low speeds and less than the displacement rate at high speeds.

The walls may have a gate valve secured thereto that is coupled to a controller. The controller automatically controls the gate valves to open and close at the openings in order to control the flow of the lubricant from the second and third spaces back into the first space. The gate valve may be a solenoid-actuated valve that is actuated via a switch coupled between the controller and the valve. The valve controller may be speed dependent. Furthermore, a temperature sensor is disposed in the bottom portion of the sealed interior portion for sensing a temperature of the lubricant for use in controlling the gate valves.

In a second embodiment, the gear and housing is a transmission. The wall and valve structure such as disclosed above is used here also.

These and other features of the present invention can be understood from the following specification and drawings.

DETAILED DESCRIPTION OF A PREFERRED EMBODIMENT

Figure 1:
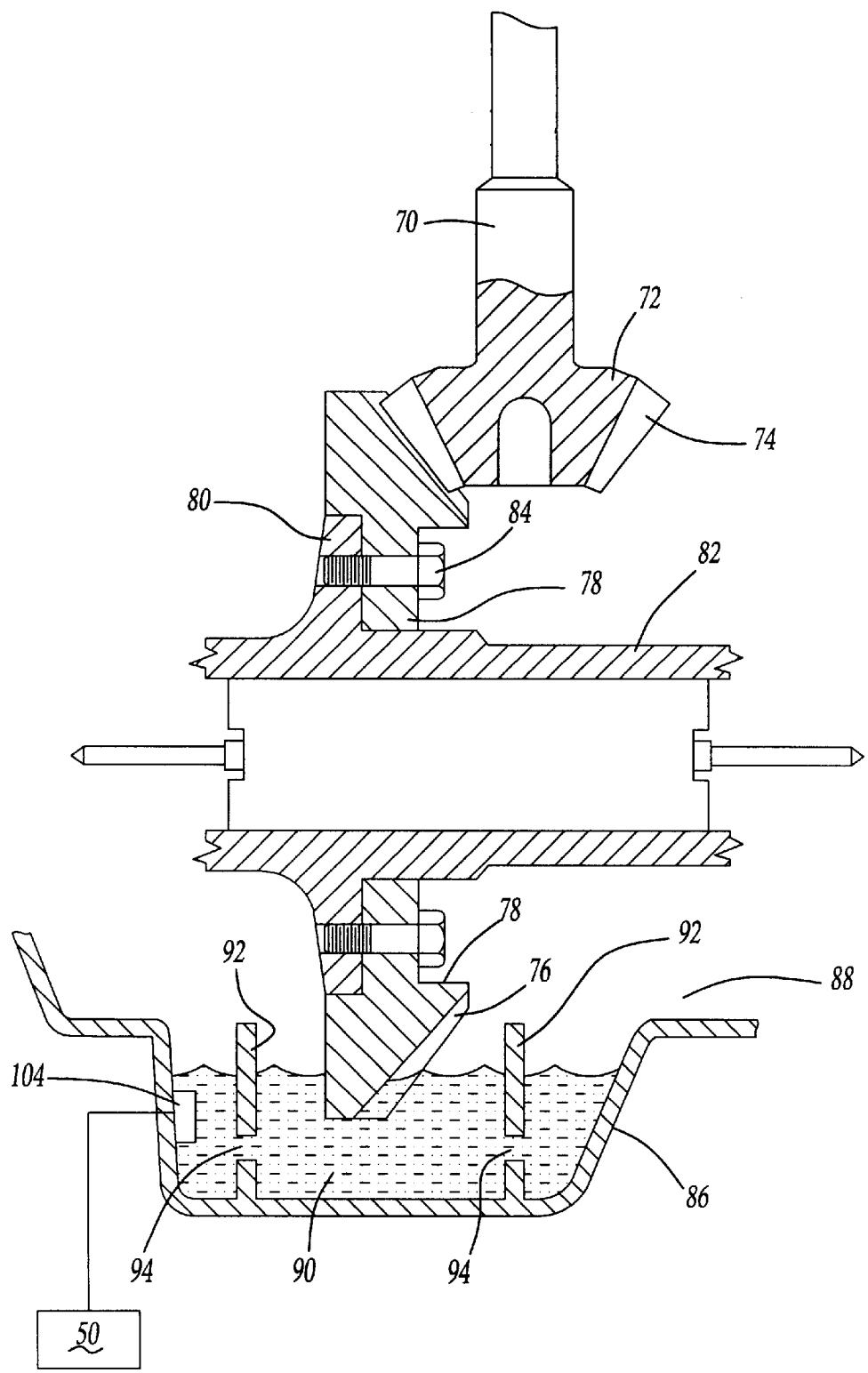
FIG. 1 is a partial sectional view of an axle housing having the dam walls according to the present invention.

Referring now to FIG. 1, an input shaft 70 of a differential gear assembly for an axle 36 terminates in a hypoid or beveled gear 72 having gear teeth 74 that mate with complementarily configured gear teeth 76 on a ring gear 78 secured to a flange 80 on a centrally disposed tubular drive member 82 by suitable fasteners 84.

A contoured, semi-circular lower housing 86 preferably extends circumferentially 180 degrees and creates a sealed interior 88 that contains a suitable weight oil or gear lubricant 90 that properly lubricates the engaging teeth 74 and 76 of the gears 72 and 78, respectively, as they rotate. The oil or gear lubricant 90 is preferably SAE 80 or 90 weight oil but may be much lighter such as SAE 30 or 40 weight depending upon the type of gears, ambient and operating temperatures and other operating considerations.

In order to minimize shear losses, at least one dam wall 92 is added inside lower housing 86, one on either side of ring gear 78. Each of the walls 92 may be cast with the bottom of the lower housing 86 or may be secured thereto utilizing any other suitable attachment means such as welding, screws, rivets, or bolts. Each of the walls 92 has an opening 94 sized to allow for oil return at a rate greater than the pumping action at low speeds and less than the gear pumping action at high speeds.

Figure 2A:
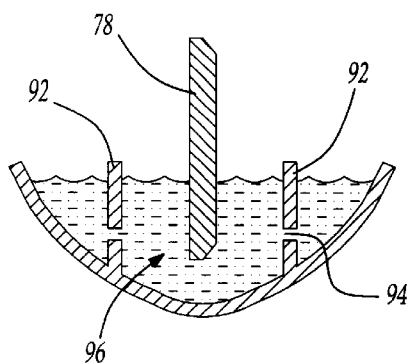
FIGS. 2a–2b are partial sectional views of the axle housing illustrating the operation of the dam walls of the present invention.
Figure 2B:
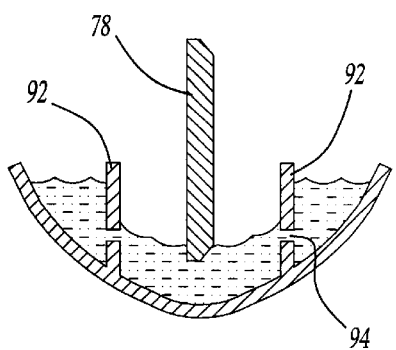

FIGS. 2a and 2b illustrate how the dam walls 92 minimize shear losses. At high speeds, the fluid level of the gear lubricant 90 is lowered in the area between the walls since the ring gear 78 splashes the lubricant 90 outside of the dam area 96, as shown in FIG. 2b. At lower speeds, the lubricant 90 is allowed to return to the dam area 96 via the openings 94 in the walls 92, as shown in FIG. 2a. Thus, at high speeds, the lubricant 90 is pumped at a rate greater than its return path.

Figure 3A:
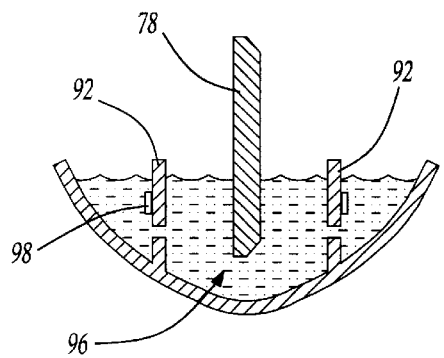
FIGS. 3a–3b are partial sectional views of the axle housing assembly illustrating the operation of the controlled openings of the dam walls of the present invention.
Figure 3B:
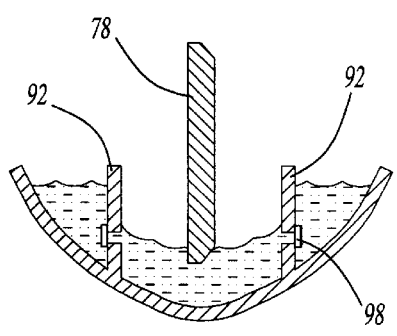
Figure 4:
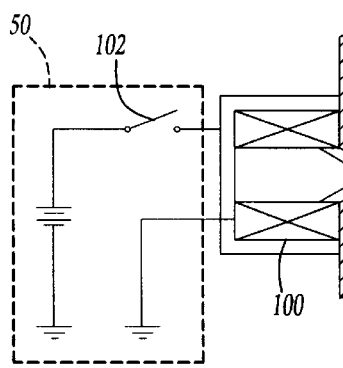
FIG. 4 is a schematic diagram of the solenoid controlled valve according to the present invention.

An alternative embodiment is illustrated in FIGS. 3a–3b. Here, gate valves 98 are added to control the return of the lubricant 90 into the dam area 96 after it has been splashed out at high speed. During high speed, the gate valves 98 are restricted to keep the level of the lubricant 90 in the dam area 96 to a minimum so that shear losses are minimized. At low speed, however, the gate valves 98 are opened via a solenoid 100 to allow the lubricant 90 to return to the dam area 96. The solenoid 100, having switch 102, may be manually controlled or automatically controlled by a microprocessor 50, as schematically shown in FIGS. 2 and 4.

The gate valves 98 are controlled as a function of vehicle speed as determined by a sensor (not shown) in communication with input shaft 70, as well as temperature of the lubricant 90 as determined by temperature sensor 104, FIG. 1. The faster the speed and the higher the temperature, the more the gate valves 98 are restricted, and vice versa. That is, at higher speed and/or higher temperature, the gate valves 98 are controlled to restrict the openings 94 to limit oil return at a rate less than the gear pumping action. At lower speed and/or lower temperature, the gate valves 98 are controlled to maximize the openings 94 to allow oil to return at a rate greater than the gear pumping action. The opening and closing of the gate valves 98 can be controlled linearly or via pulse width modulation.

Figure 5:
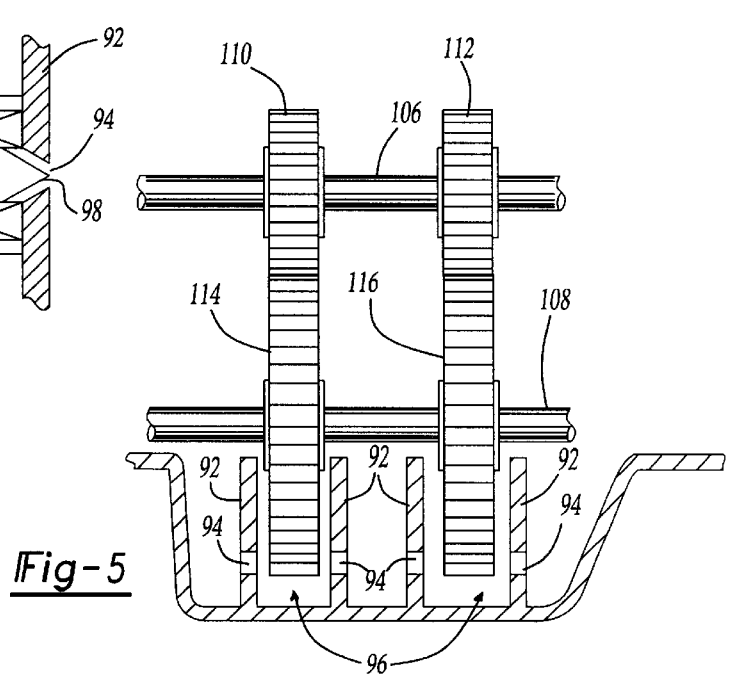
FIG. 5 is a partial sectional view of another application of the inventive active sump.

Turning now to FIG. 5, there is shown a partial sectional view of another application of the inventive active sump of the present invention. In this embodiment, the gear housing may be a transmission housing or a transfer case having an input shaft 106 and a counter shaft 108. Input shaft 106 includes first and second gears 110 and 112, respectively, that correspond to and engage with respective counter shaft gears 114 and 116, respectively. In this embodiment, dam walls 92 are provided on each side of the counter gears 114, 116. As discussed above, each of the dam walls 92 include an opening 94 having a predetermined size for allowing the lubricant to flow back into the oil sump or reservoir at a rate greater than a displacement rate at low speeds and less than the displacement rate at high speeds. As with the axle housing embodiment, this application may also include gate valves 98 for restricting or enabling the flow of the gear lubricant through the openings 94. This embodiment would function much like the earlier embodiment.

Preferred embodiments have been disclosed. However, a worker in this art would recognize that modifications would come within the scope of this invention. Thus, the following claims should be studied to determine the scope and content of this invention.

What is claimed is:

1. A device for controlling a level of gear lubricant in a gear housing of a vehicle comprising:

a housing having a sealed interior portion containing lubricant and a gear rotatably mounted in the housing that rotates through the lubricant;

said housing having a first wall secured to a bottom portion of the sealed interior portion defining a first and second space, wherein the gear rotates in the first space and displaces the lubricant over the first wall into the second space as the gear rotates at high speeds, the first wall having an opening of a predetermined size for allowing the lubricant to flow back into the first space at a rate greater than the displacement rate at low speeds and less than the displacement rate at high speeds; and a first gate valve secured to said first wall and a controller for controlling said first gate valve to open and close at the opening to control the flow of lubricant from said second space back into said first space, said first gate valve being a solenoid, actuated valve and said device further comprising a switch coupled between said controller and said solenoid, actuated valve for actuating the solenoid, actuated value in response to said controller.

2. The device as recited in claim 1 wherein the gear is part of an axle.

3. The device as recited in claim 1 wherein the gear is part of a transmission.

4. The device as recited in claim 1 wherein the gear is part of a transfer case.

5. A device as recited in claim 1, wherein said control controlling said first gate valve dependent upon a speed of rotation of said gear.

6. A device for controlling a level of gear lubricant in a gear housing of a vehicle comprising:

a housing having a sealed interior portion containing lubricant and a gear rotatably mounted in the housing that rotates through the lubricant;

said housing having a first wall secured to a bottom portion of the sealed interior portion defining a first and second space, wherein the gear rotates in the first space and displaces the lubricant over the first wall into the second space as the gear rotates at high speeds, the first wall having an opening of a predetermined size for allowing the lubricant to flow back into the first space at a rate greater than the displacement rate at low speeds and less than the displacement rate at high speeds;

a first gate valve secured to said first wall and a controller for controlling said first gate valve to open and close at the opening to control the flow of lubricant from said second space back into said first space; and a temperature sensor disposed in the bottom portion of the sealed interior portion for sensing a temperature of the lubricant and controlling the first gate valve.

7. A device for controlling a level of gear lubricant in a gear housing of a vehicle comprising:

a housing having a sealed interior portion containing lubricant and a gear rotatably mounted in the housing that rotates through the lubricant;

said housing having a first wall secured to a bottom portion of the sealed interior portion defining a first and second space, wherein the gear rotates in the first space and displaces the lubricant over the first wall into the second space as the gear rotates at high speeds, the first wall having a second opening of a predetermined size for allowing the lubricant to flow back into the first space at a rate greater than the displacement rate at low speeds and less than the displacement rate at high speeds; and a second wall secured to the bottom portion of the sealed interior portion defining a third space, wherein the gear rotates in the first space between the first and second walls and displaces the lubricant over the first wall and second walls into the second and third spaces as the gear rotates at high speeds, the second wall having an opening of a predetermined size for allowing the lubricant to flow back into the third space at a rate greater than the displacement rate at low speeds and less than the displacement rate at high speeds.

8. The device as recited in claim 7 further comprising:

a first gate valve secured to the first wall; and a controller for controlling the first gate valve to open and close at the opening to control the flow of the lubricant from the second space back into the first space.

9. The device as recited in claim 7 further comprising:
a second gate valve secured to the second wall; and
a controller for controlling the second gate valve to open and close at the opening to control the flow of the lubricant from the third space back into the first space.

10. The device as recited in claim 9 wherein the second gate valve is a solenoid-actuated valve and the device further comprising a second switch coupled between the controller and the solenoid-actuated valve for actuating the solenoid-actuated valve in response to the controller.

11. The device as recited in claim 9 further comprising a temperature sensor disposed in the bottom portion of the sealed interior portion for sensing a temperature of the lubricant in controlling the second gate valve.

* * * * *